United States Patent
Kurihara et al.

(10) Patent No.: US 7,718,938 B2
(45) Date of Patent: May 18, 2010

(54) SPATIAL INFORMATION DETECTION SYSTEM INCLUDING A PLURALITY OF DETECTION DEVICES WITH NONOVERLAPPING LIGHT PROJECTION PERIODS

(75) Inventors: Fumikazu Kurihara, Kadoma (JP); Yuji Takada, Kadoma (JP); Yusuke Hashimoto, Kadoma (JP); Fumi Tsunesada, Kadoma (JP)

(73) Assignee: Panasonic Electric Works Co., Ltd., Kadoma-Shi (JP)

( * ) Notice: Subject to any disclaimer, the term of this patent is extended or adjusted under 35 U.S.C. 154(b) by 179 days.

(21) Appl. No.: 11/918,745

(22) PCT Filed: Apr. 17, 2006

(86) PCT No.: PCT/JP2006/308024

§ 371 (c)(1),
(2), (4) Date: Oct. 18, 2007

(87) PCT Pub. No.: WO2006/112431

PCT Pub. Date: Oct. 26, 2006

(65) Prior Publication Data

US 2009/0072170 A1    Mar. 19, 2009

(30) Foreign Application Priority Data

Apr. 18, 2005   (JP)   ............................. 2005-120200

(51) Int. Cl.
*G01B 11/14*   (2006.01)

(52) U.S. Cl. ............... 250/201.2; 250/206.1; 250/206.2; 250/559.2

(58) Field of Classification Search ............ 250/559.19, 250/559.2, 559.22, 559.29, 559.39, 559.04, 250/559.06, 559.27, 559.45; 356/601, 4.06, 356/4.07, 4.02
See application file for complete search history.

(56) References Cited

U.S. PATENT DOCUMENTS 5,905,576 A * 5/1999 Takada et al. ............... 356/623

(Continued)

FOREIGN PATENT DOCUMENTS

JP    7-012556    1/1995

(Continued)

OTHER PUBLICATIONS

International Search Report for Application No. PCT/2006/308024, dated May 23, 2006.

*Primary Examiner*—Georgia Y Epps
*Assistant Examiner*—Tony Ko
(74) *Attorney, Agent, or Firm*—Edwards Angell Palmer & Dodge LLP

(57) ABSTRACT

A spatial information detection system, which is capable of, even when detecting spatial information from a common target space by use of a plurality of detection devices, achieving accurate detection without causing interference between the detection devices. Each of the detection devices has a light emitting source for projecting light intensity-modulated with a modulation period into the target space, a photodetector for receiving light from the target space, and an evaluation portion for detecting the spatial information of the target space from a change between the light projected from the light emitting source and the light received by the photodetector. The system includes a timing control portion for controlling the timings of projecting the lights from the light emitting sources such that a light projection period of the light emitting source of one of the detection devices does not overlap with the light projection period of the light emitting source of another detection device.

10 Claims, 9 Drawing Sheets

U.S. PATENT DOCUMENTS 7,009,690 B2 * 3/2006 Kamon et al. .................. 356/3
7,138,646 B2 * 11/2006 Hashimoto et al. ..... 250/559.38

FOREIGN PATENT DOCUMENTS

| | | |
|---|---|---|
| JP | 9-270688 | 10/1997 |
| JP | 2001-222786 | 8/2001 |
| JP | 2001-337166 | 12/2001 |
| JP | 2002-131016 | 5/2002 |
| JP | 2004-045304 | 2/2004 |
| WO | WO-96/015626 | 5/1996 |
| WO | WO-2004/008175 | 1/2004 |

* cited by examiner

SPATIAL INFORMATION DETECTION SYSTEM INCLUDING A PLURALITY OF DETECTION DEVICES WITH NONOVERLAPPING LIGHT PROJECTION PERIODS

BACKGROUND OF THE INVENTION

1. Field of the Invention

The present invention relates to a spatial information detection system for receiving light from a target space, into which an intensity-modulated light is being irradiated, to detect information about the target space.

2. Description of the Related Art

In the past, the technique of detecting spatial information such as a distance to an object existing in a target space by receiving light from the target space, into which an intensity-modulated light is being projected, and determining a phase difference in modulation component between the projected light and the received light has been utilized. For example, this technique is disclosed in PCT International Publications Nos. WO96/15626 and WO2004/008175, and it is essential to use a detection device basically composed of a light emitting source for projecting light intensity-modulated with a predetermined modulation period to the target space, a photodetector having a photoelectric converting portion configured to receive light from the target space, and to generate electric charges corresponding to a received light amount, and an evaluation portion for detecting spatial information of the target space from a change between the light projected from the light emitting source and the light received by the photodetector.

By the way, because this kind of detection device projects the intensity-modulated light into the target space, there is an inconvenience when detecting the spatial information from a common target space by use of a plurality of detection devices. That is, when lights are simultaneously projected to the target space from the detection devices, it becomes difficult to distinguish the light projected into the target space from the light emitting source of one of the detection devices from the light projected from another one of the detection devices into the target space. In brief, because each of the detection devices cannot extract only the light projected by its own light emitting source from the lights projected to the target space, there causes a problem that the detection accuracy of the spatial information deteriorates.

SUMMARY OF THE INVENTION

In consideration of the above problem, a primary concern of the present invention is to provide a spatial information detection system, which is capable of, when detecting the spatial information from a common target space by use of a plurality of spatial information detection devices, accurately detecting the spatial information by each of the detection devices.

That is, in the spatial information detection system of the present invention, it is essential to use a plurality of detection devices. Each of the detection devices comprises a light emitting source configured to project light intensity-modulated with a predetermined modulation period into a target space, a photodetector having a photosensitive portion configured to receive light from the target space to generate electric charges corresponding to a received light amount, and an evaluation portion configured to detect spatial information of the target space from a change between the light projected from the light emitting source and the light received by the photodetector. The spatial information detection system of the present invention includes a timing control portion configured to control timings of projecting the lights from the light emitting sources of the detection devices such that a light projection period of the light emitting source of one of the detection devices does not overlap with the light projection period of the light emitting source of another one of the detection devices, and also control the photodetector of each of the detection devices to have a light receiving period where the photosensitive portion receives the light from the target space in the light projection period to generate the electric charges, and a read-out period for taking out the electric charges generated at the photosensitive portion, which is set in at least one of the light projection period and a rest period where the light of the light emitting source is not projected into the target space.

According to the present invention, by the formation of the timing control portion for controlling the timings of projecting the lights from the light emitting sources of the detection devices such that the light projection periods do not overlap with each other, it is possible to detect the spatial information of the target space by each of the detection devices without causing interference between the lights projected from the detection devices into the target space.

In the above spatial information detection system, the read-out period can be set within the light projection period or so as to straddle the border of the light projection period and the rest period and include at least a part of the rest period. For the following reason, it is particularly preferred that the timing control portion controls the photodetector of each of the detection devices such that the read-out period is set within the rest period. For example, in the case of using a photodetector, such as a CCD image sensor, which repeatedly performs switching operations in the light receiving period to accumulate electric charges with respect to a specific time period, when the light receiving period is not set to be independent from the read-out period, electrical noises generated by the switching operations may be mixed in the electric charges read out in the read-out period. In such a case, because the light receiving period is separated from the read-out period by setting the read-out period within the rest period, it is possible to prevent the noises derived from the switching operations from being mixed in the electric charges during the read-out operation. As a result, the reliability of detection accuracy can be improved.

In addition, it is preferred that a timing control portion is formed in each of the detection devices, and the timing control portion in one of the detection devices outputs a synchro signal to the timing control portion in another one of the detection devices at the end of the light projection period of the light emitting source in the one of the detection devices, so that the timing control portion which has received the synchro signal allows the light emitting source in the another one of the detection devices to initiate the light projection period. According to this configuration, by transferring the synchro signal from one detection device to another, the light projection periods of the detection devices can be shifted from each other. That is, it is possible to prevent overlapping of the light projection periods of the detection devices by a sophisticated configuration of forming a channel for transforming the synchro signal between the timing control portions of the detection devices. In addition, it is preferred that the timing control portion which has received the synchro signal allows the light emitting source to await the initiation of the light projection period until the read-out period is finished in the another one of the detection devices. In this case, it is possible to stably ensure a constant read-out period, without starting the light projection period in the middle of the read-out period of electric charges in the photodetector of each of the detection devices.

It is also preferred that the timing control portion has a mode switching portion configured to selectively set one of a master function where the light emitting source of the detection device having the timing control portion autonomously projects the light and a slave function where the light emitting source of the detection device passively projects the light according to the synchro signal received from the timing control portion of the other detection device.

In place of using the above configuration where the plural timing control portions work in cooperation with each other, it is also preferred that the spatial information detection system comprises a central control portion configured to output synchro signals to the timing control portions formed in the detection devices at different timings, and the timing control portion which has received the synchro signal allows the light emitting source of the detection device having the timing control portion to initiate the light projection period.

It is also preferred that the timing control portion controls a length of the light projection period in each of the detection devices according to the received-light amount of the photosensitive portion. In this case, the light projection period is preferably set to be longer as the received-light amount of the photosensitive portion decreases. In addition, the detection devices preferably comprise a short range detection device where a short light projection period is set, a long range detection device where a long light projection period is set, and a middle range detection device where the light projection period is set to be longer than the short light projection period, and shorter than the long light projection period. In this configuration, since the received light intensity of the reflection light from the object becomes smaller as the distance to the object increases on the assumption that there is no change in reflectance of the object existing in the target space, the received-light amount can be ensured by the photodetector with the longer light projection period as larger the distance to the object. In addition, when objects having different reflectances are located in the target space such that a distance to each of the objects is approximately equivalent, the received-light amount decreases as the reflectance becomes smaller. Therefore, in this case, the received-light amount can be ensured by prolonging the light projection period as smaller the reflectance of the object. Thus, the dynamic range of the whole system can be widened by controlling the light projection period in accordance with the received-light intensity.

In addition, it is preferred that the spatial information detection system further comprises a setting portion configured to set plural light projection periods having different lengths in each of the detection devices, and a decision portion configured to make a decision as to whether the received-light amount obtained in each of the plural light projection periods is not larger than a predetermined threshold value, and the evaluation portion detects the spatial information of the target space by use of a maximum received light amount, which is not larger than the predetermined threshold value. In this case, since the spatial information is detected by use of the largest received-light amount in a permissible range of the photodetector, it is possible to achieve a further improvement in detection accuracy of the spatial information. In addition, since the received-light amount changes with the length of the light projection period, the dynamic range of each of the detection devices can be increased.

Furthermore, it is preferred that the spatial information detection system comprises a setting portion configured to set a unit period including a predetermined number of light projection periods with respect to each of the detection devices, and a time adjusting portion configured to reduce the number of light projection periods in the unit period set with respect to one of the detection devices according to environments of the target space, and extend the light projection period(s) of another one of the detection devices by adding time equivalent to the reduced number of light projection period(s).

As a particularly preferred embodiment of the time adjusting portion, the time adjusting portion is configured to reduce the number of light projection periods with respect to one of the detection devices where the received-light amount reaches a prescribed value at a smaller number of light projection periods than the predetermined number of light projection periods set in the unit period, and extend the light projection period(s) of another one of the detection devices where the received-light amount does not reach the prescribed value by adding time equivalent to the reduced number of light projection period(s). In this configuration, when the received-light amount of one of the detection devices reaches the prescribed value at the smaller number of light projection periods than the predetermined number of light projection periods in the unit period, a remaining light projection period(s) of the detection device can be efficiently used for another detection device with less received-light amount. In addition, there is an advantage that each of the detection devices can be stably operated in an unsaturated light amount range of the photodetector. In brief, a suitable light projection period can be allocated to each of the detection devices depending on the received-light intensity.

Further characteristics of the present invention and advantages brought thereby will be clearly understood from the best mode for carrying out the invention described below.

DETAILED DESCRIPTION OF EXEMPLARY EMBODIMENTS

In the exemplary embodiments explained below, a distance measuring device for measuring a distance to an object in a target space is exemplified as a detection device used in the spatial information detection system of the present invention. However, the spatial information is not limited to the distance. For example, the spatial information further includes information obtained by removing an environmental light component such as reflectance of the object in the target space. In addition, the distance measuring device explained below generates a distance image where each pixel is associated with a distance to each position in the target space by taking an image of the target space.

(Basic Configuration of Detection Device)

Figure 1:
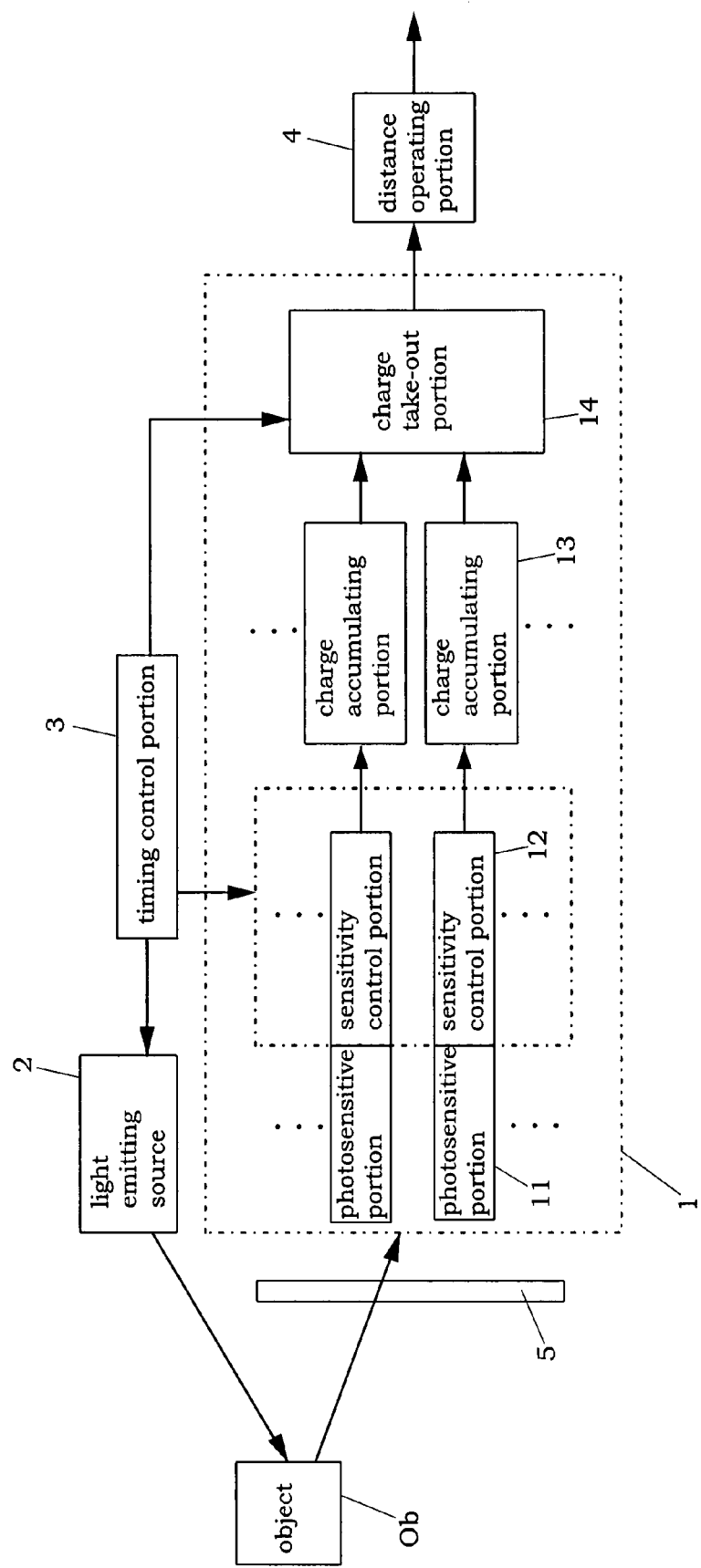
FIG. 1 is a block diagram showing a basic configuration of a detection device used in a spatial information detection system according to a preferred embodiment of the present invention.

As shown in FIG. 1, the distance measuring device used in this embodiment is provided with a light emitting source 2 for projecting light into a target space, and a photodetector 1 for receiving light from the target space to provide an output corresponding to the received light amount. A distance to an object Ob in the target space is determined by time (i.e., time of flight) required from the projection of the light from the light emitting source 2 into the target space to the incident of a reflected light from the object Ob on the photodetector 1. In this regard, because the time of flight is extremely short, an intensity-modulated light where the intensity of the light projected into the target space changes at a constant cycle is projected from the light emitting source 2 into the target space, and a phase difference between the projected light and the received light is determined with respect to the modulated component of the intensity of light. The technique of converting this phase difference into the time of flight is used.

Figure 2:
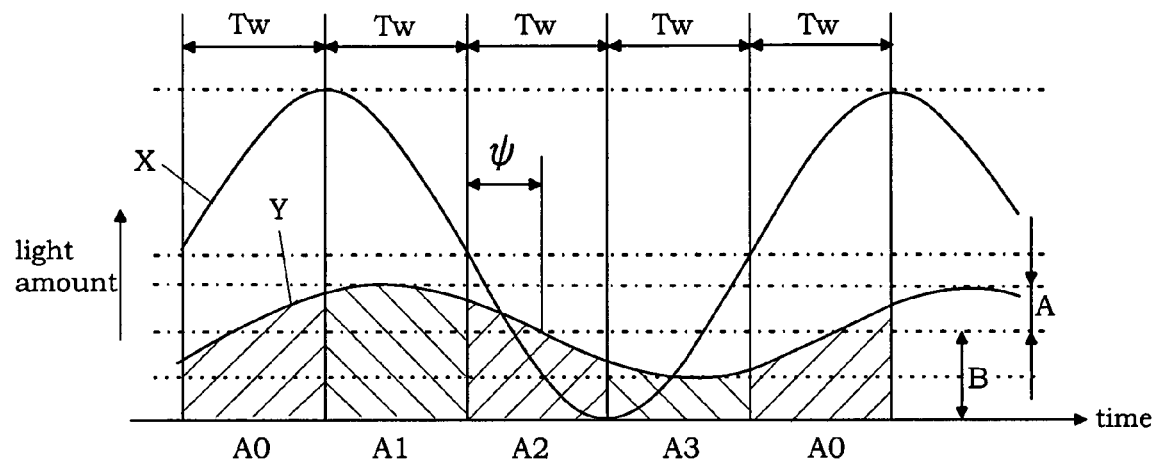
FIG. 2 is an operation explanatory diagram of the detection device.

That is, the intensity of light emitted from the light emitting source 2 into the target space is modulated in a sine wave shape, as shown by the curve X in FIG. 2. On the assumption that the received-light amount of the photodetector 1 changes, as shown by the curve Y in FIG. 2, the phase difference ψ corresponds to the time of flight. Therefore, by determining the phase difference ψ, the distance to the object Ob can be determined. That is, when the unit of the phase difference ψ is (rad), the distance to the object Ob is L (m), the speed of light is c (m/s), and angular frequency of the intensity-modulated light is ω (rad/s), the distance L is expressed by the following equation.

$$L = \psi \cdot c / 2\omega$$

The phase difference ψ can be calculated by using the received-light amounts of the curve Y obtained at plural timings of the curve X. For example, the received-light amounts of the curve Y obtained at phase ranges of the curve X, i.e., 0 to 90 degrees, 90 to 180 degrees, 180 to 270 degrees, and 270 to 360 degrees are respectively defined as A0, A1, A2 and A3 (In FIG. 2, the received-light amounts (A0, A1, A2, A3) are shown by hatching areas). Therefore, the received-light amount (A0, A1, A2, A3) in each of the phases is equivalent to an integrated value of the period Tw provided at every 90 degrees. In this regard, it is assumed that the phase difference ψ (i.e., the distance to the object Ob) and the reflectance of the object Ob do not change during the process of obtaining the received-light amount (A0, A1, A2, A3). In addition, the intensity of the light emitted from the light emitting source 2 is modulated by sine wave, and the intensity of the light received at a time t by the photodetector 1 is expressed by A·sin(ωt+δ)+B, wherein A is an amplitude, B is a direct-current component (average value of environmental light component and reflected-light component), ω is an angular frequency of the intensity-modulated light (ω=2πf; f is a modulation frequency), and δ is an initial phase. From these conditions, the phase difference ψ can be expressed by the following equation:

$$\psi = \tan^{-1}(A2 - A0)/(A1 - A3)$$

In this equation, depending on the integration range (for example, a phase width of one zone in the above case is 90 degrees, but it may be 180 degrees), the sign may change, or the phase may be different by 90 degrees. Anyway, the phase difference ψ can be determined by use of the received-light amounts (A0, A1, A2, A3) of the above-mentioned four zones.

Because it is necessary to modulate the intensity of the light projected into the target space with a modulation signal having a relatively high modulation frequency, a light source having a high-speed response characteristic is used as the light emitting source 2. For example, a large number of light emitting diodes arranged on a single plane, or a combination of a semiconductor laser and a divergent lens can be used as the light emitting source 2. The modulation signal for driving the light emitting source 2 is output from a timing control portion 3 described later, and the intensity of the light emitted from the light emitting source 2 is modulated by the modulation signal. For example, the timing control portion 3 outputs a sine wave of 10 MHz as the modulation signal. Alternatively, the waveform of the modulation signal may be a triangular wave or a saw-tooth wave other than the sine wave.

The photodetector 1 has a plurality of photosensitive portions 11 arranged in an orderly fashion. In addition, a light receiving optical system 5 is disposed on an incident path of the light into the photosensitive portions 11. Therefore, the light provided from the target space is incident on the photosensitive portions 11 through the light receiving optical system 5, so that electric charges corresponding to the received light amount are generated. In addition, the photosensitive portions 11 are arranged on lattice points of a planar lattice. For example, the photosensitive portions 11 can be arranged in a matrix manner such that each of the photosensitive portions 11 is equally spaced from an adjacent one with respect to the vertical direction (i.e., longitudinal direction) and the horizontal direction (i.e., lateral direction).

Each of the photosensitive portions 11 is associated with a line-of-sight direction of viewing the target space from the photodetector 1 by the light receiving optical system 5. That is, an incident range of the light to each of the photosensitive portions 11 through the light receiving optical system 5 can be regarded as a conical viewing field where a center of the light receiving optical system 5 is an apex, and a small apex angle is set with respect to each of the photosensitive portions 11. Therefore, when the light irradiated from the light emitting source 2 is reflected by the object Ob in the target space, and the reflected light is incident on the photosensitive portion 11, it is possible to find a direction where the object Ob exists with respect to a reference direction that is an optical axis of the light receiving optical system 5, according to the position of the photosensitive portion 11 receiving the reflected light.

The light receiving optical system 5 is usually disposed such that its optical axis is orthogonal to the plane, on which the photosensitive portions 11 are arranged. Therefore, when an orthogonal coordinate system is set such that the center of the light receiving optical system 5 is the origin, and three axes directions consist of the longitudinal and lateral directions on the plane, on which the photosensitive portions 11 are arranged, and the optical axis of the light receiving optical system 5, angles (so-called azimuthal angle and elevation angle) obtained by expressing the position of the object Ob in the target space with spherical coordinates correspond to each of the photosensitive portions 11. The light receiving optical system 5 may be disposed such that its optical axis is intersected by an angle other than 90 degrees with the plane, on which the photosensitive portions 11 are arranged.

In the present embodiment, as described above, to determine the distance to the object Ob, the received light amounts (A0, A1, A2, A3) of the four zones, which are synchronized with a change in intensity of the light projected from the light emitting source 2 into the target space, are used. Therefore, it is necessary to control timings of obtaining the intended received light amounts (A0, A1, A2, A3). In addition, because the amounts of electric charges generated by the photosensitive portion 11 in one cycle of the intensity change of the light projected from the light emitting source 2 into the target space are small, it is desired to accumulate the electric charges over plural cycles. In this embodiment, as shown in FIG. 1, a plurality of charge accumulating portions 13 are formed, each of which is used to accumulate the electric charges generated by the photosensitive portion 11, and a sensitivity control portion 12 is formed to allow the charge accumulating portion 13 to accumulate the electric charges generated by the photosensitive portion 11 at a timing. This timing is controlled by the timing control portion 3.

Figure 3:
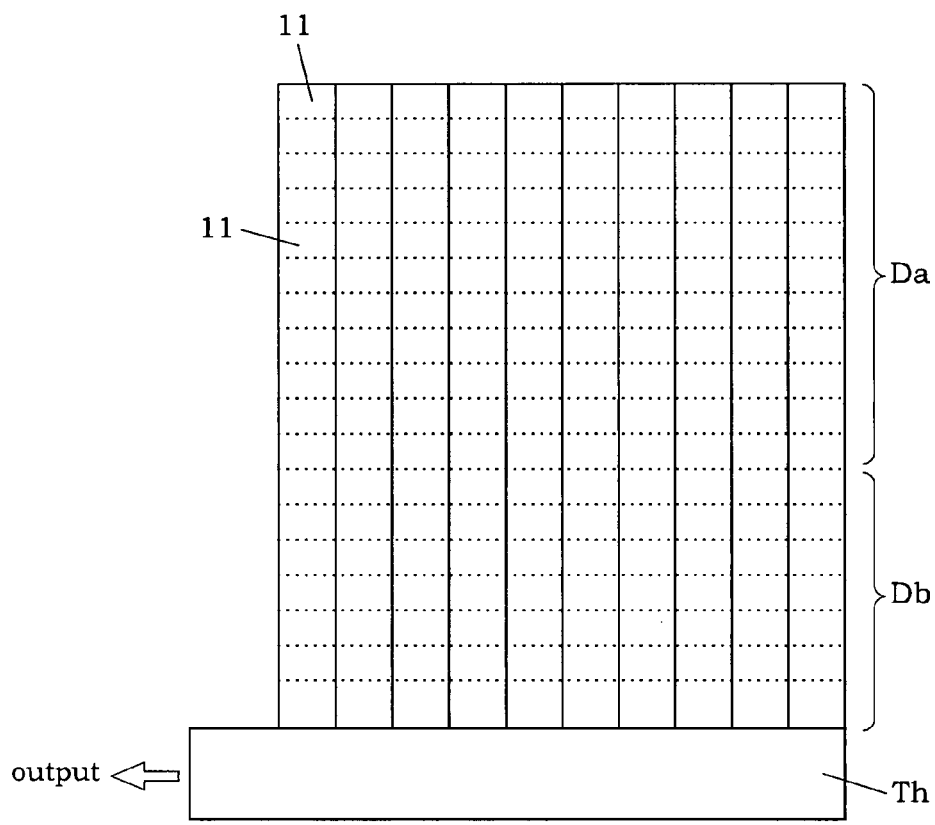
FIG. 3 is a plan view of a photodetector of the detection device.

As shown in FIG. 3, the photodetector 1 used in the present embodiment is formed on a single semiconductor substrate by arranging a plurality of photosensitive portions 11 in a matrix manner (e.g., 100×100). The photosensitive portions 11 of each of rows in the vertical direction share an integrally formed semiconductor layer. The semiconductor layer is used as a transfer channel of electric charges (electrons are used in this embodiment) in the vertical direction. Moreover, a horizontal transfer portion Th is formed in the semiconductor substrate, which is a CCD for receiving electric charges from one end of the semiconductor layer in each of the rows, and transferring the electric charges in the horizontal direction. That is, the semiconductor layer is used as both of the photosensitive portion 11 and the transfer channel of electric charges.

As in the case of a frame transfer (FT) type CCD image sensor, this photodetector 1 has an image-pickup region Da, at which the photosensitive portions 11 are arranged, and a light-shielded storage region Db formed adjacent to the image-pickup region Da. In addition, the electric charges transferred from the image-pickup region Da to the storage region Db can be taken out to the outside through the horizontal transfer portion Th. The transfer of electric charges from the image-pickup region Da to the storage region Db is performed at once in a vertical blanking period. In the horizontal transfer portion Th, the electric charges of one horizontal line are transferred in one horizontal period. A charge take-out portion 14 shown in FIG. 1 includes the functions of the horizontal transfer portion Th and the transfer channel of electric charges in the vertical direction in the semiconductor layer. In this regard, the charge accumulating portion 13 does not mean the storage region Db. It means the function of accumulating the electric charges in the image-pickup region Da. In other words, the storage portion Db is included in the charge take-out portion 14.

By the way, the sensitivity control portion 12 is controlled by the timing control portion 3 so as to be high sensitivity in the four zones corresponding to the received light amounts (A0, A1, A2, A3) described above, and the electric charges equivalent to the received light amounts (A0, A1, A2, A3) are accumulated in the charge accumulating portions 13. In this regard, as a result of the use of the similar configuration to the FT type CCD image sensor, the method of controlling the timing of accumulating the electric charges is restricted. In the present embodiment, the function of the sensitivity control portion 12 is actualized by forming a discarding electrode capable of discarding electric charges every photosensitive portion 11. That is, by controlling a voltage applied to the discarding electrode such that the electric charges are discarded with the exception of the zone corresponding to the desired received light amount (A0, A1, A2, A3), only the electric charges of the desired zone are accumulated in the image-pickup region Da, and then the accumulated electric charges are transferred to the storage region Db. Because it is necessary to match applying the voltage to the discarding electrode with the zone corresponding to the received light amount (A0, A1, A2, A3), the photodetector 1 repeats switching according to ON/OFF of the discarding voltage.

In the meanwhile, when the light projected from the light emitting source 2 into the target space is reflected by the object Ob, and the reflected light is incident on the photosensitive portion 11 of the photodetector 1, the intensity of the received light is relatively small. Therefore, even if the electric charges corresponding to the received light amount (A0, A1, A2, A3) of each of the zones described above are accumulated in the charge accumulating portion 13 in one modulation period of the intensity modulated light, sufficient differences between the received light amounts (A0, A1, A2, A3) are not obtained. As a result, measurement accuracy of distance may deteriorate. Under the circumstances, in fact, the electric charges generated in each of the zones are accumulated in the charge accumulating portion 13 in plural modulation periods (e.g., 10000 periods) of the intensity-modulated light, and then taken out from the photodetector 1 through the charge take-out portion 14. The timing where the electric charges are taken out through the charge take-out portion 14 is controlled by the timing control portion 3.

In the following explanation, a period of accumulating the electric charges in the charge accumulating portion 13 (i.e., a period where electric charges of an intended zone are generated in the photosensitive portion 11) is referred hereinafter as light receiving period, and a period where the electric charges accumulated in the charge accumulating portion 13 are taken out (ejected) from the charge take-out portion 14 is referred hereinafter as read-out period.

By the way, in the above configuration, when four photosensitive portions 11 located adjacent to each other are used as one set, the electric charges of the four zones described above can be accumulated in the charge accumulating portions 13 by use of the four photosensitive portions 11 of this one set. That is, by controlling the sensitivity control portions 12 corresponding to the four photosensitive portions 11 in association with the four zones for the received light amounts (A0, A1, A2, A3), it is possible to accumulate the electric charges equivalent to the received light amounts (A0, A1, A2, A3) in the four charge accumulating portions 13. According to this operation, the received light amounts (A0, A1, A2, A3) of the four zones can be extracted by one set of the light receiving period and the read-out period. Therefore, there is an advantage that the distance to the object Ob can be determined by use of the information obtained within a relatively short time. However, because the four photosensitive portions 11 are used for one direction of the target space, the resolving power reduces to a quarter, as compared with the case where the single photosensitive portion 11 is associated with one direction of the target space. In addition, since the four photosensitive portions 11 located at different positions are associated with the one direction of the target space, the possibility where each of the photosensitive portions 11 receives a reflected light from other than the object Ob is high. As a result, it may lead to mismeasurement of the distance.

On the other hand, when the single photosensitive portion 11 is associated with the one direction of the target space, the resolving power becomes higher. Therefore, under the condition that the object Ob remains stationary, it is possible to reduce the mismeasurement of the distance to the object Ob. However, because four sets of the light receiving period and the read-out period become necessary, an error easily occurs in the distance measurement under the condition that the object Ob is relatively moving. Under these circumstances, in the present embodiment, two photosensitive portions 11 are used as one set, and the electric charges equivalent to the four received light amounts (A0, A1, A2, A3) are extracted by two sets of the light receiving period and the read-out period. That is, the first one of the two light receiving periods is used to take out the electric charges equivalent to the received light amounts (A0, A2), and the second one of the two light receiving periods is used to take out the electric charges equivalent to the received light amounts (A1, A3).

A received light output of the photodetector 1 described above is sent to a distance operating portion 4 as an evaluation portion. The distance operating portion 4 receives the electric charges equivalent to the four received light amounts (A0, A1, A2, A3), determines the phase difference $\psi$ by substituting them in the above equation or a table corresponding to the equation, and then determines the distance to the object Ob from the phase difference $\psi$. Since the distance operating portion 4 determines distances with respect to plural directions of the target space, it is possible to obtain three-dimensional information about the target space, and generate a distance image having pixel values, each of which is associated with a distance value.

First Embodiment

Figure 4:
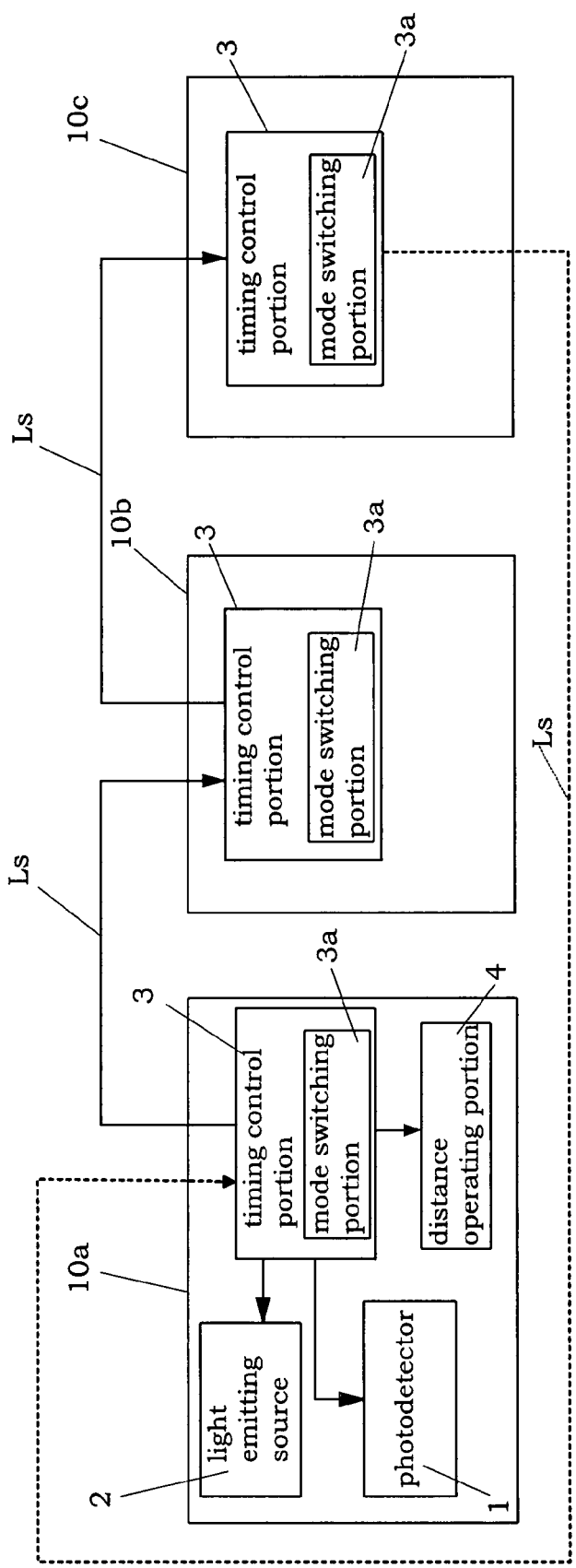
FIG. 4 is a block diagram of a spatial information detection system according to a first embodiment of the present invention.

As shown in FIG. 4, a spatial information detection system of this embodiment includes three detection devices (10a~10c), each of which is provided by the distance measuring device described above. That is, each of the detection devices (10a~10c) is formed with the light emitting source 2, the photodetector 1, and the distance operating portion 4. In addition, each of the detection devices (10a~10c) has the timing control portion 3 for giving the modulation signal to the light emitting source 2, and allowing the light emitting source 2 to project the intensity-modulated light into the target space, as described above. The timing control portion 3 of this embodiment has a function of controlling the light emitting source 2 to set a light projecting period where the light is projected from the light emitting source 2 into the target space, and a rest period where the light is not projected from the light emitting source 2 into the target space. That is, each of the detection devices (10a~10c) intermittently projects the intensity-modulated light into the target space.

The timing control portions 3 formed in the detection devices (10a~10c) are associated with each other. In the present embodiment, one of the detection devices (10a~10c) is a master capable of actively autonomously projecting the light, and the other detection devices are slaves capable of passively projecting the light according to a synchro signal provided from the master. That is, in the case of FIG. 4, the detection device 10a functions as the master, and the detection devices (10b, 10c) function as the slaves. Therefore, the master detection device 10a has a function of sending out the synchro signal, and the slave detection device 10b has a function of receiving the synchro signal from the master detection device 10a, and sending out a synchro signal to the slave detection device 10c. In addition, the slave detection device 10c has a function of receiving the synchro signal from the detection device 10b. Each of the detection devices (10a~10c) is connected to an adjacent detection device by a signal line Ls such that the synchro signal can be transmitted between the detection devices. Besides the wired transmission channel, a wireless transfer channel may be used.

Figure 5:
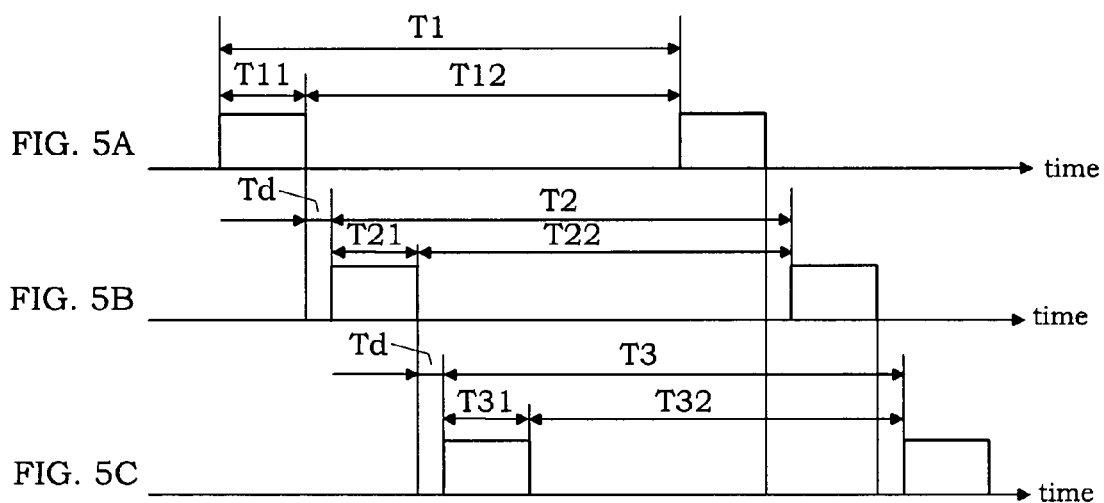
FIGS. 5A to 5C are operation explanatory diagrams of the spatial information detection system of FIG. 4.

A basic operation for setting the light projection period and the rest period by the timing control portion 3 is explained below. The detection devices (10a~10c) used in the present embodiment are the same in configuration and operation. The timing control portion 3 formed in each of the detection devices (10a~10c) has a mode switching portion 3a for selectively setting one of the master function and the slave function. For example, when the master function is selected by the mode switching portion 3a of the detection device 10a of the three detection devices (10a~10c), the master detection device 10a automatically repeats the light projection period T11 having a predetermined length by a constant light projection cycle T1, as shown in FIG. 5A. That is, the master detection device 10a is operated in a self-propelled manner to project the light from the light emitting source 2 into the target space 2 over the light projection period T11 every light projection cycle T1.

A period other than the light projection period T11 in the light projection cycle T1 corresponds to the rest period T12 where the light is not projected from the light emitting source 2 into the target space. In the present embodiment, the read-out period for taking out the electric charges from the photodetector 1 to the distance operating portion 4 is set in the rest period T12. As in the case of the conventional CCD image sensor, the read-out period is a period needed to read out the electric charges per one image plane, which is determined by the number of the charge accumulating portions 13 and a period (cycle) of a clock signal for driving the charge take-out portion 14. That is, the read-out period is not related to the light projection period T11, and it is recommended to set the rest period T12 to be longer than the read-out period. Thus, when the read-out period is set to be included in the rest period T12, it is possible to prevent switching noise from being mixed in with the electric charges during the read-out operation, even when the switching of the sensitivity control portion 12 of the photodetector 1 is repeatedly performed in the light receiving period to accumulate the electric charges corresponding to the received-light amount (A0, A1, A2, A3) of a specific zone synchronized with the modulation signal. In the present embodiment, the rest period T12 is set to be substantially equal to the read-out period. In the following embodiments, the read-out period is set within the rest period T12, as in the present embodiment. However, the read-out period may be overlapped with a part of the light projection period T11.

In the master detection device 10a, when the light projection period T11 is finished, the synchro signal is output to the slave detection device 10b. That is, as shown in FIG. 5B, when the light projection period T11 of the detection device 10a is finished, the detection device 10b receives the synchro signal, and the light projection period T21 is started. In this regard, a delay time Td occurs between the end of the light projection period T11 of the detection device 10a and the start of the light projection period T21 of the detection device 10b. Then, when the light projection period T21 of the detection device 10b is finished, the synchro signal is output to the slave detection device 10c, as shown in FIG. 5C, and the light projection period T31 of the detection device 10c is started. Similarly, the delay time Td occurs between the end of the light projection period T21 of the detection device 10b and the start of the light projection period T31 of the detection device 10c. As described above, because the detection devices (10a~10c) used in the present embodiment are the same in configuration and operation, the light projection cycles (T2, T3) of the detection devices (10b, 10c) are equal to the light projection cycle T1 of the detection device 10a (i.e., T1=T2=T3). Because the relation of T11=T21=T31 is realized with respect to the light projection periods, the relation of T12=T22=T32 is also realized, wherein T22 and T32 are the rest periods of the detection devices (10b, 10c), respectively. Furthermore, the following relations are realized.

$$T1=T11+T12$$

$$T2=T21+T22$$

$$T3=T31+T32$$

$$T12 \geq T21+T31+2Td$$

$$T22 \geq T31+T11+2Td$$

$$T32 \geq T11+T21+2Td$$

In accordance with the above relations, the light projection periods (T21, T31) are finished during the rest period T12 where the master detection device 10a is operated in the self-propelled manner. By this operation, the lights can be projected from all of the detection devices (10a~10c) into the target space during the light projection cycle T1 of the master detection device 10a without overlapping those lights with each other. In brief, because each of the detection devices (10a~10c) can separately measure the distance, it is possible to prevent each of the detection devices (10a~10c) from mismeasurement caused when plural lights are simultaneously projected into the target space.

In the above case, the three detection devices (10a~10c) are used. However, when satisfying a condition that the rest period T12 of the master detection device 10a is longer than the sum of the light projection periods of the remaining detection devices (in fact, the sum of the delay times determined by the number of the remaining detection devices is also added), four or more of the detection devices becomes available.

In each of the detection devices (10a~10c), the reset period is set to be approximately equal to the read-out period. Therefore, when the read-out period of one of the detection devices (10a~10c) is in progress, the other detection device projects the light into the target space. Alternatively, after the light projection period and the read-out period of one of the detection devices are finished, the light projection period of the other detection device may be started.

Furthermore, in the above-described case, the slave detection device 10c has only the function of receiving the synchro signal. If necessary, as shown by the dotted line in FIG. 4, the slave detection device 10c may have a function of sending a synchro signal to the master detection device 10a. In this case, the master detection device 10a also has a function of receiving the synchro signal from the slave detection device 10c in addition to the function of giving the timing of the light projection period to the slave detection device 10b. According to this configuration, the master detection device 10a can detect that all of the light projection periods of the slave detection devices (10b, 10c) are finished. Therefore, it is possible to accurately determine the timing of the next light projection period. In other words, it is possible to certainly prevent that the light projection periods of the detection devices (10a~10c) overlap with each other.

Second Embodiment

Figure 6:
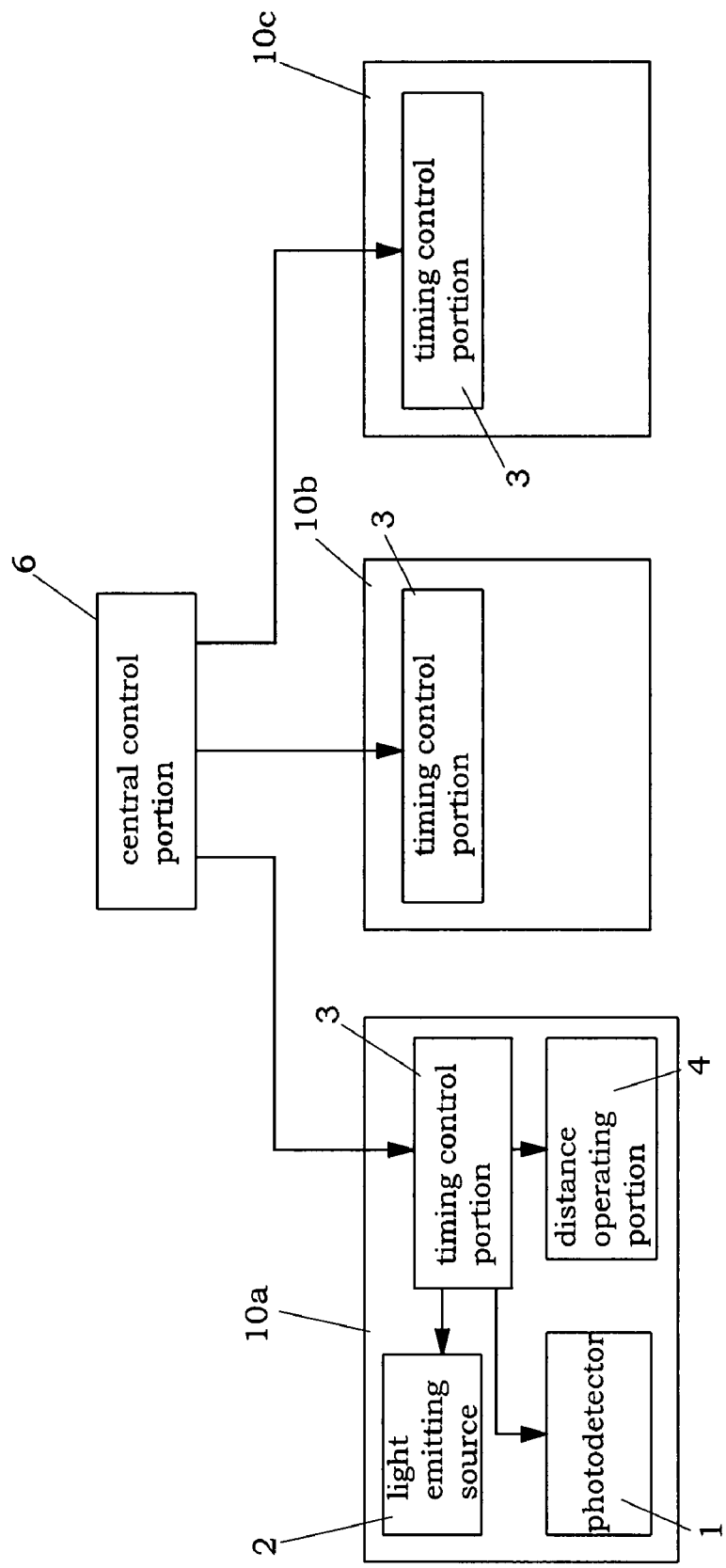
FIG. 6 is a block diagram of a spatial information detection system according to a second embodiment of the present invention.

In the first embodiment, the timing control portions 3 formed in the detection devices are associated with each other. In the present embodiment, as shown in FIG. 6, a central control portion 6 separately formed from the detection devices (10a~10c) issues an order to each of the timing control portions 3 such that the light projection periods and the rest periods of all of the detection devices (10a~10c) are controlled in a concentrated manner. In brief, the central control portion 6 controls the light projection period and the rest period of each of the detection devices (10a~10c) in a lump sum. Therefore, it is not needed that the detection devices (10a~10c) are associated with each other to prevent overlapping of the light projection periods of the detection devices. According to this configuration, because the timings of operating plural detection devices can be controlled by the single central control portion 6, the light projection period and the rest period can be readily set with a high degree of freedom under the condition that the number of the detection devices is not larger than the number of the detection devices connectable to the central control portion 6. The other configurations and operations are substantially the same as the first embodiment, and therefore duplicate explanations are omitted.

Third Embodiment

Figures 7A, 7B, 7C:
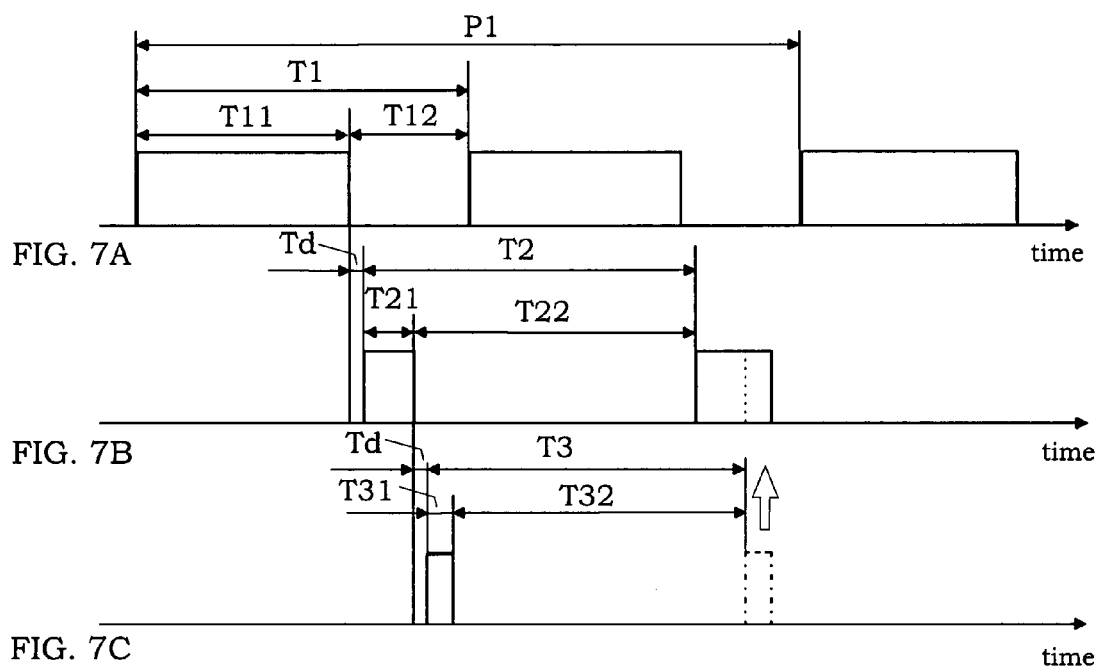
FIGS. 7A to 7C are operation explanatory diagrams of a spatial information detection system according to a third embodiment of the present invention.

In the first embodiment, the detection devices (10a~10c) are the same in configuration and operation. In the present embodiment, the light projection periods of the detection devices (10a~10c) are set to have different lengths from each other. That is, in the first embodiment the light projection periods (T11, T21, T31) of the detection devices (10a~10c) are set to be equal to each other, and the rest periods (T12, T22, T32) thereof are set to be equal to each other. On the other hand, as shown in FIGS. 7A to 7C in the present embodiment the light projection periods and the rest periods are set so as to satisfy the relations of T11>T21>T31, and T12>T22>T32. In this regard, T11+T12=T21+T22=T31+T32, and the light projection cycles (T1, T2, T3) are equal to each other. In addition, as in the case of the first embodiment, the following relations are realized.

$$T12 \geq T21+T31+2Td$$

$$T22 \geq T31+T11+2Td$$

$$T32 \geq T11+T21+2Td$$

By the way, under the condition that the intensity of the light projected from the light emitting source 2 into the target space is the same, and a reflectance of the object Ob is constant, when the reflected light from the object Ob is received by the photodetector 1, the received-light intensity decreases as the distance to the object Ob becomes large. Therefore, to keep the received light amount (i.e., time integration of the received-light intensity) at a prescribed amount, it is desired to extend the light receiving time as larger the distance to the object Ob. On the other hand, when the light receiving time is extended, the intensity of the reflected light increases as smaller the distance to the object Ob. As a result, the photodetector 1 becomes easy to be saturated. From this viewpoint, it is desired to reduce the light receiving time as smaller the distance to the object Ob.

Under these circumstances, the detection devices of the present embodiment have different distance measurement ranges. That is, the detection device 10a is used as a long range detection device, the detection device 10b is used as a middle range detection device, and the detection device 10c is used as a short range detection device. By maximizing the light projection period T11 of the detection device 10a, it is possible to ensure the reflected light amount from the object Ob, which exists far off. On the other hand, by minimizing the light projection period T31 of the detection device 10c, it is possible to reduce the reflected light amount from the object, which exist at a short distance, and prevent the photodetector 1 from saturation.

For example, when all of the spatial information existing at a long distance, the spatial information existing at a middle distance, and the spatial information existing at a short distance are detected by use of a single detection device, the light receiving time is generally set to be short in consideration of the received-light amount from the object located at the short distance in order to prevent the photodetector from saturation. However, in this case, the received-light amount from the object located at the middle or long distance relatively decreases, so that it becomes difficult to detect the spatial information of the object having low reflectance, or the spatial information of the object located at the long distance in the target space. In the present embodiment, the three detection devices are respectively used as the long, middle and short range detection devices, and the light receiving time can be separately set with respect to each of the photodetectors to obtain a sufficient received light amount within the unsaturated range. For example, when the light receiving time of the long range detection device is set to be long, and the light receiving time of the short range detection device is set to be short, the dynamic range of the photodetector can be effectively used in each of the detection devices. Therefore, the spatial information existing at different distances in the target space can be detected with equivalent accuracy by use of the plural photodetectors.

In addition, when all of the spatial information existing at the long distance, the spatial information existing at the middle distance, and the spatial information existing at the short distance are detected by use of the single detection device, there may be a problem that time required for the detection is extended. For example, when the light receiving times for the long distance, the middle distance and the short distance are respectively set to 8 ms, 4 ms and 2 ms, and the read-out time is 15 ms constant, a minimum time needed to obtain the spatial information existing at these distances is 59 ms (=(8+15)+(4+15)+(2+15)). On the other hand, in the present embodiment, the operations of the three detection devices are controlled by the timing control portions. For example, as shown in FIGS. 7A to 7C, after the light receiving time for the long distance is finished, the light receiving time for the middle distance can be started during the read-out time for the electric charges corresponding to the light amount received from the long distance. Similarly, after the light receiving time for the middle distance is finished, the light receiving time for the short distance can be started during the read-out time for the electric charges corresponding to the light amount received from the middle distance. Therefore, under the above described conditions of the light receiving times and the read-out time, a minimum time required to obtain the spatial information existing at these distances is about 29 ms (=8 (T11)+4 (T21)+2 (T31)+15 (T32)). In this case, the delay time Td is out of consideration. Thus, according to the present invention, it is possible to improve the detection efficiency of the spatial information existing at different distances, and achieve an improvement in frame rate.

Figure 8:
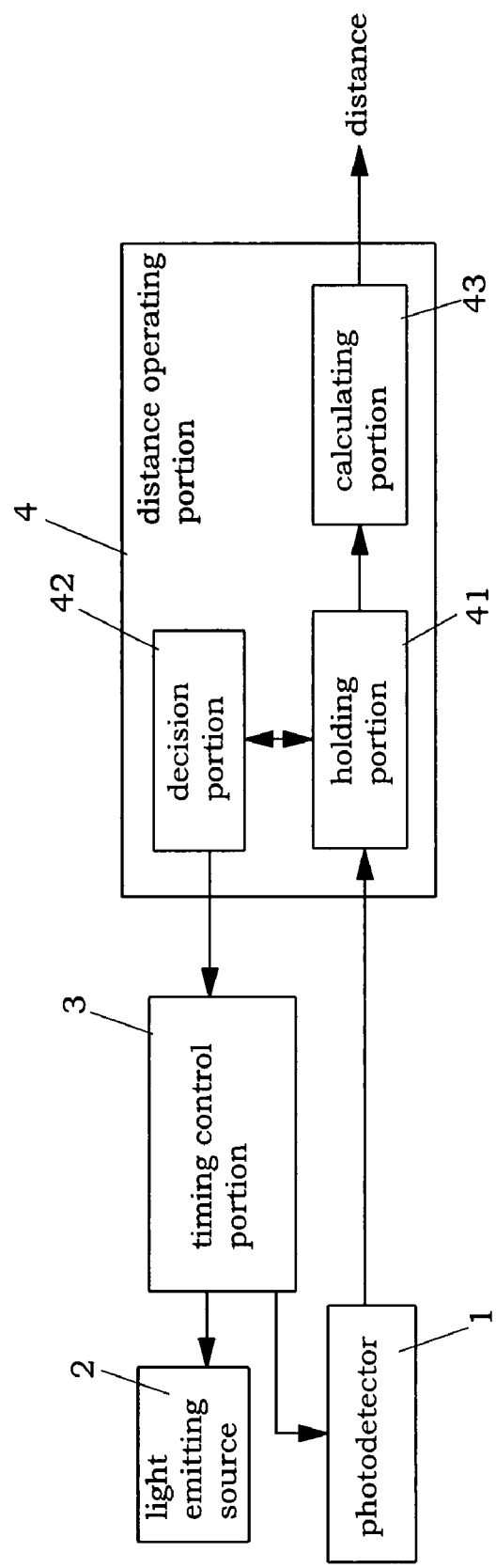
FIG. 8 is a block diagram showing a modification of the third embodiment.

In this embodiment, as shown in FIG. 7A, a unit period P1 is defined to be two times as long as the light projection cycle T1 of the detection device 10a. The unit period P1 can be set by a setting portion (not shown). Alternatively, the unit period P1 may be set by the timing control portion 3. In addition, as shown in FIG. 8, the distance operating portion 4 of each of the detection devices (10a~10c) has a holding portion 41 for holding the received-light output of the photodetector 1 over two cycles of the light projection cycle T1, and a calculating portion 43 for calculating the distance by using an integrated value of the received light amount corresponding to the light projection period (T11, T21, T31) in the unit period P1. As clearly understood from FIGS. 7A to 7C, two sets of the light projection periods (T11, T21, T31) of the detection devices (10a~10c) are included (the read-out time is not always included) in the time period corresponding to the two cycles of the light projection cycle T1. The distance operating portion 4 also has a decision portion 42 for comparing the received-light amount obtained every light projection period (T11, T21, T31) with a predetermined light amount range, and making a decision as to whether the received-light amount is within the predetermined light amount range or not.

When the decision portion 42 makes a decision that the received-light amount obtained in the light projection period (T11, T21, T31) of the front half of the unit period P1 is smaller than the predetermined light amount range, the received-light amount obtained in the light projection period (T11, T21, T31) of the last half of the unit period P1 is added to the received-light amount obtained at the front half thereof in the holding portion 41, and then the total received light amount is used to calculate the distance. On the other hand, when the decision portion 42 makes another decision that the received-light amount obtained in the light projection period (T11, T21, T31) of the front half of the unit period P1 is within the predetermined range of the light amount, an order of canceling the light projection period (T11, T21, T31) of the last half of the unit period P1 is given to the timing control portion 3. In addition, when the decision portion 42 makes a decision that the received-light amount obtained in the light projection period (T11, T21, T31) of the front half of the unit period P1 is larger than the predetermined range, the light projection period (T11, T21, T31) of the last half of the unit period P1 is reduced than usual such that the received-light amount falls within the predetermined light amount range. Alternatively, the distance measurement obtained in the unit period P1 is cancelled, and the measurement is started again by use of another unit period having a shorter light projection period.

With respect to the short-range and middle-range detection devices (10b, 10c), when the light projection period (T21, T31) of the last half of the unit period P1 is cancelled, an order of extending the light projection period (T11, T21) of the detection device (10a, 10b), which is used for longer range measurement than the detection device (10b, 10c), by a redundant time resulting from the cancellation of the light projection period (T21, T31) is given from a time adjusting portion (not shown) formed in the timing control portion 3 to the detection device (10a, 10b). The attached drawing shows a case where the received-light amount obtained in the light projection period T31 of the front half of the unit period P1 by the short-range detection device 10c reaches the predetermined light amount range. In this case, the light projection period T31 of the last half of the unit period P1 for the short-range detection device 10c is cancelled, and the light projection period T21 of the last half of the unit period P1 for the middle-range detection device 10b is extended by the redundant time resulting from the cancellation of the light projection period T31.

Similarly, when the received-light amount obtained in the light projection period T21 of the front half of the unit period P1 by the middle-range detection device 10b reaches the predetermined light amount range, the light projection period T21 of the last half of the unit period P1 for the middle-range detection device 10b is cancelled, and the light projection period T11 of the last half of the unit period P1 for the long-range detection device 10a can be extended by the redundant time resulting from the cancellation of the light projection period T21. In the detection device (10a, 10b) where it is desired to extend the light projection period (T11, T21), when the received-light amount falls within the predetermined light amount range, the light projection period (T11, T21) is not extended. In addition, when the received-light amount obtained in the light projection period (T21, T31) of the front half of the unit period P1 in each of the middle-range detection device 10b and the short-range detection device 10c falls within the predetermined light amount range, and the received-light amount obtained in the light projection period T11 of the front half of the unit period P1 in the long-range detection device 10a does not fall within the predetermined light amount range, the light projection period T11 of the last half of the unit period P1 for the long-range detection device 10a may be extended by a total of redundant times resulting from the cancellation of the light projection periods (T21, T31) of the last half of the unit period P1. In the case of canceling the light projection period T21 of the last half of the unit period P1 for the middle-range detection device 10b, the light projection period T31 of the last half of the unit period P1 for the short-range detection device 10c may be extended by the redundant time resulting from the cancellation of the light projection period T21 of the last half of the unit period P1, if necessary.

The other configurations and operations are substantially the same as the first embodiment, and therefore duplicate explanations are omitted. In the above-explained embodiment, the two sets of the light projection periods (T11, T21, T31) are set in the unit period P1. Alternatively, three or more sets of the light projection periods may be set. Moreover, in the above explanation, the unit period P1 has two light projection periods with respect to each of the detection devices, and the received-light amounts (A0, A2) of the two zones are extracted in each of the two light projection periods. Therefore, when the received-light amount obtained in the light projection period of the front half of the unit period falls within the predetermined light amount range, the received-light amounts (A0, A2) can be extracted, and there is no inconvenience of canceling the light projection period of the last half of the unit period. However, in the case of obtaining the four kinds of the received-light amounts (A0, A1, A2, A3) from the unit period P1 by extracting the received-light amounts (A0, A2) of the two zones in one of the two light projection periods, and then extracting the received-light amounts (A1, A3) of the remaining two zones in the other light projection period, the two light projection periods are essentially needed in the unit period P1 even in the short-range detection device 10c. In brief, even when the received-light amounts (A0, A2) of the two zones obtained in the light projection period of the front half of the unit period P1 fall within the predetermined light amount range, the light projection period of the last half thereof needed to obtain the received-light amounts (A1, A3) of the remaining two zones can not be cancelled. Thus, at least two light projection periods are needed to obtain the four kinds of the received-light amounts (A0, A1, A2, A3). For example, when four light projection periods are set in the unit period P1, and the four kinds of the received-light amounts (A0, A1, A2, A3) are obtained by using two of the four light projection periods, the remaining two light projection periods can be cancelled.

In the present embodiment, it was explained about the case where the received-light intensity of the photodetector 1 changes with the distance to the object Ob. Alternatively, the same configuration will be used in a case where the received-light intensity changes depending on reflectance of the object Ob. That is, the detection devices (10a~10c) can be formed for different reflectance ranges in the case where a plurality of objects Ob exist at an approximately same distance.

In the above embodiment, it was also explained about the case where the number of the light projection periods in the unit period P1 is dynamically changed depending on the received-light amount. Alternatively, another configuration may be used, in which the number of the light projection periods in the unit period P1 is separately set with respect to each of the detection devices (10a~10c), and the light projection period of one of the detection devices is extended by a redundant time, which is obtained by setting a smaller number of the light projection periods in the other detection device. In brief, the length of the light projection period and the number of the light projection periods can be previously set in a fixed manner.

Fourth Embodiment

In the present embodiment the distance is determined in the distance operating portion 4 by selling two kinds of (long and short) light projection periods, and selectively using one of the light projection periods, at which the charge accumulating portion 13 is not saturated. The longer one of the light projection periods is referred hereinafter to as long light projection period, and the shorter one of the light projection periods is referred hereinafter to as short light projection period. To simplify the explanation, the two kinds of the light projection periods are set in the present embodiment. Alternatively, three or more light projection periods having different lengths may be set. In addition, the light projection periods having the different lengths can be set by a setting portion (not shown). Alternatively, it is preferred to set or change the length of each of the light projection periods by the timing control portion 3.

Figure 9:
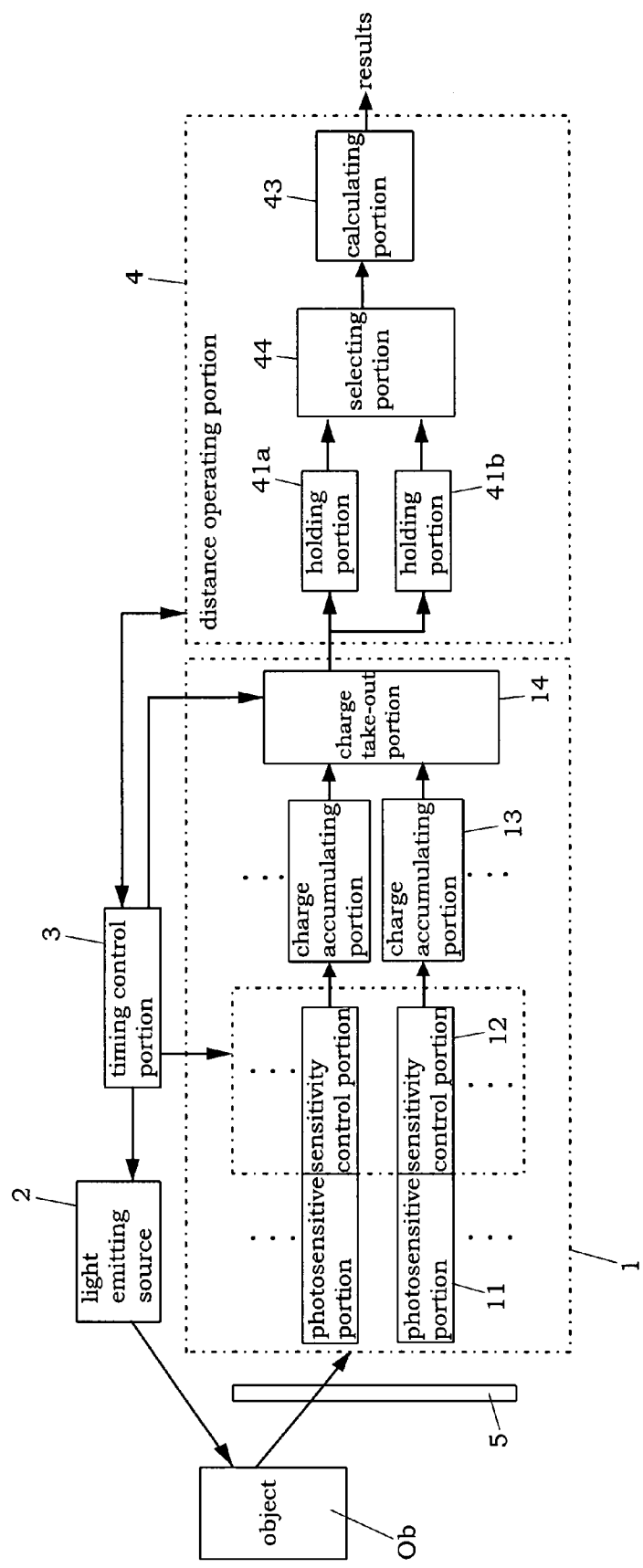
FIG. 9 is a block diagram of a spatial information detection system according to a fourth embodiment of the present invention.

In the distance operating portion 4 of this embodiment, a received-light output is provided from the photodetector 1 every light projection period, and an appropriate one of the received-light outputs obtained in the long and short light projection periods is selected to determine the distance. For example, as shown in FIG. 9, the distance operating portion 4 has a pair of holding portions (41a, 41b) for temporarily holding the received-light outputs respectively obtained in the long and short light projection periods, and a selecting portion 44 for evaluating the received-light outputs of the holding portions (41a, 41b), and sending the received-light output held in one of the holding portions (41a, 41b) to the calculating portion 43. In brief, the selecting portion 44 selects one of the long and short light projection periods, and the calculating portion 43 calculates the distance every pixel by use of the received-light output selected by the selecting portion 44.

In the selecting portion 44, the received-light output held in the holding portion 41a is compared with a predetermined saturation threshold value. When the received-light output does not exceed the saturation threshold value, the holding portion 41a corresponding to the long light projection period is selected. On the other hand, when the received-light output held in the holding portion 41a corresponding to the long light projection period exceeds the saturation threshold value, the holding portion 41b corresponding to the short light projection period is selected. In the case where the receive-light output held in the holding portion 41b also exceeds the saturation threshold value, another process such as reducing the sensitivity will be needed.

In addition, when an image signal input from the photodetector 1 in the distance operating portion 4 is converted into digital data by an analog-digital conversion, it is preferred that memories for storing the digital data are formed as the holding portion (41*a*, 41*b*), and the selecting portion 44 selects the digital data stored in the memories.

Figures 10A, 10B:
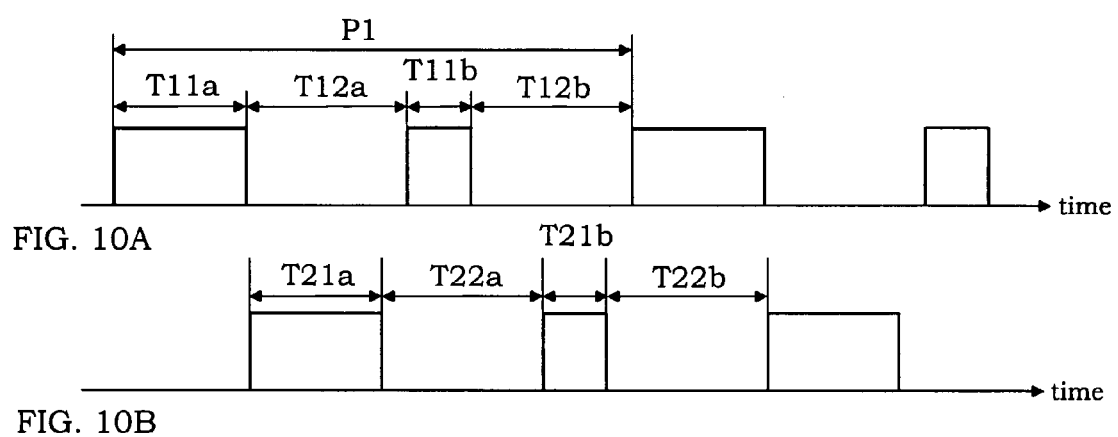
FIGS. 10A and 10B are operation explanatory diagrams of the spatial information detection system of FIG. 9.

The spatial information detection system of this embodiment is specifically explained according to an operation example shown in FIG. 10A. In the timing control portion 3, the long light projection period T11*a* is firstly set as the light projection period of the photodetector 1, and electric charges corresponding to the received-light amounts (A0, A2) are accumulated in the charge accumulating portions 13. The electric charges are read out in the rest period T12*a*, and then stored in the holding portion 41*a*. Next, the short light projection period T11*b* is set as the light projection period, and the electric charges corresponding to the received-light amounts (A0, A2) are accumulated in the charge accumulating portions 13. The electric charges are read out in the rest period T12*b*, and then stored in the holding portion 41*b*. Thus, in the unit period P1, which is equal to a total of the long light projection period T11*a*, the short light projection period T11*b*, and the rest periods (T12*a*, T12*b*), the electric charges corresponding to the received-light amounts (A0, A2) are stored in the holding portions (41*a*, 41*b*).

Similarly, in the next unit period P1, which is equal to a total of the long light projection period T11*a*, the short light projection period T11*b*, and the rest periods (T12*a*, T12*b*), the electric charges corresponding to the received-light amounts (A1, A3) are stored in the holding portions (41*a*, 41*b*). As a result, the electric charges corresponding to the four kinds of received-light amounts (A0, A1, A2, A3) can be stored in the holding portions (41*a*, 41*b*) by the two unit periods, and the calculation of the distance becomes possible in the calculating portion 43. In this regard, the received-light output corresponding to the long light projection period T11*a* is held in the holding portion 41*a*, and the received-light output corresponding tot the short light projection period is held in the holding portion 41*b*.

After the received-light outputs corresponding to the received-light amounts (A0, A1, A2, A3) of the four zones needed to determine the distance are obtained with respect to each of the long and short light projection periods (T11*a*, T11*b*), and then stored in the holding portions (41*a*, 41*b*), the selecting portion 44 compares the largest one of the received-light outputs corresponding to the long light projection period T11*a* held in the holding portion 41*a* with the saturation threshold value. The saturation threshold value is a threshold value for checking the saturation of the photodetector 1. When the largest one of the received-light outputs held in the holding portion 41*a* (In FIG. 2, the received-light output corresponding to the received-light amount A1 is at the maximum.) is not greater than the saturation threshold value, the distance can be determined by use of the received-light outputs obtained in the long light projection period. In this case, the measurement accuracy of the distance can be improved.

When one of the received-light outputs of the four zones held in the holding portion 41*a* exceeds the saturation threshold value, the largest one of the received-light outputs held in the holding portion 41*b* is compared with the saturation threshold value. In a use environment assumed, the short light projection period T11*b* is set such that the received-light outputs held in the holding portion 41*b* do not exceed the saturation threshold value. When the holding portion 41*b* is selected, the calculation of the distance becomes possible in most cases. In this case, since the received-light outputs become smaller than the received-light outputs held in the holding portion 41*a*, the measurement accuracy of the distance slightly lower, but the distance measurement is still possible. The comparison between the received-light output and the saturation threshold value is performed every pixel. For the pixel where the distance can be calculated by use of the received-light outputs held in one of the holding portion (41*a*, 41*b*), the distance is determined with respect to the pixel.

By the way, as explained in the first embodiment, when a plurality of detection devices (10*a*, 10*b*) are used (In this explanation, the number of the detection devices is 2.), the master detection device 10*a* and the slave detection device 10*b* can be formed such that a synchro signal is provided from the master detection device 10*a* to the slave detection device 10*b*. Thereby, as shown in FIGS. 10A and 10B, it is possible to prevent that the long and short light projection periods (T11*a*, T11*b*) of the master detection device 10*a* overlap with the long and short light projection periods (T21*a*, T21*b*) of the slave detection device 10*b*. In this regard, T11*a*=T21*a*, T11*b*=T21*b*, and T11*a*, T11*b*, T21*a*, T21*b*<T12*a* (=T12*b*=T22*a*=T22*b*, the delay time is out of consideration). That is, the rest periods (T22*a*, T22*b*) of the detection device 10*b* are set to be equal to the rest periods (T12*a*, T12*b*) of the detection device 10*a*. In each of the detection devices (10*a*, 10*b*), the rest-out period can be set to be shorter than the rest period. In this explanation, it is assumed that they are approximately equal to each other.

In the case where the long light projection period T11*a* of the detection device 10*a* is finished, and then the long light projection period T21*a* of the detection device 10*b* is started, or where the short light projection period T11*b* of the detection device 10*a* is finished, and then the short light projection period T21*b* of the detection device 10*b* is started, the long light projection period T21*a* or the short light projection period T21*b* of the slave detection device 10*b* is included in the reset period (T12*a*, T12*b*) of the master detection device 10*a*. Therefore, the long light projection period T11*a* does not overlap with the long light projection period T21*a*, and similarly the short light projection period T11*b* does not overlap with the short long light projection period T21*b*. However, when the short light projection period T21*b* of the detection device 10*b* is started immediately after the short light projection period T11*b* of the detection device 10*a* is finished, it means that the short light projection period T21*b* is started in the detection device 10*b* before the termination of the rest period T22*a* following the long light projection period T21*a*. In this case, the rest periods (T22*a*, T22*b*) of the slave detection device 10*b* is controlled by the timing control portion 3. That is, after the slave detection device 10*b* receives the synchro signal from the master detection device 10*a*, the slave detection device 10*b* awaits the termination of the rest period (T22*a*, T22*b*), and then starts the long light projection period T21*a* or the short light projection period T21*b*. According to this configuration, it is possible to stably ensure the read-out period, which can be set to be shorter than the rest period (T12, T12*b*, T22*a*, T22*b*), but it is assumed that they are approximately equal to each other in this case, while preventing overlapping between the long light projection periods (T11*a*, T21*a*) and between the short light projection periods (T11*b*, T21*b*). The other configurations and operations are substantially the same as the other embodiments, and therefore duplicate explanations are omitted.

In the above, it was explained about the case of using the two detection devices (10*a*, 10*b*). Alternatively, three or more detection devices (10*a*~10*c*) may be connected in sequence, as in the case of the first embodiment. That is, as described above, when one of the detection devices (10*a*~10*c*) receives the synchro signal from an adjacent one of the detection devices, the detection device with the receipt of the synchro signal checks the termination of its own rest period, and then starts the next light projection period. In this regard, when the rest period (T12a, T12b) of the master detection device 10a is not shorter than the total of the light projection periods of the other detection devices, the detection device 10a can be suitably operated in a self-propelled manner. In the case of controlling the plural detection devices in a concentrated manner by the central control portion 6, it is recommendable to control those detection devices such that the light projection periods do not overlap with each other.

By the way, the received-light amount (A0, A1, A2, A3) contains an environmental-light component as well as the light emitted from light emitting source 2. When variations in environmental-light component happen in a negligibly short period of time, an average value (i.e., (A0, A1, A2, A3)/4) of the received-light amounts (A0, A1, A2, A3) of the four zones corresponds to a total of an amplitude ("A" in FIG. 2) of the reflected-light component obtained when the light emitted from the light emitting source 2 is reflected on the object Ob and the environmental-light component ("B-A" in FIG. 2). That is, the average value is shown by "B" in FIG. 2. Therefore, in the distance operating portion 4, when the average charge amount determined with respect to the received-light amounts (A0, A1, A2, A3) of four zones is compared with an appropriate saturation threshold value, it is possible to make a decision as to whether the photodetector 1 has been saturated or not. According to this decision result, one of the electric charges obtained in the long light projection period (T11a, T21a) and the electric charges obtained in the short light projection period (T11b, T21b) may be selected.

In place of using the average value, the maximum value of the received-light amounts (A0, A1, A2, A3) of the four zones may be compared with the saturation threshold value. By the way, in an environment that is rich in the environmental-light component, even when a ratio of the reflected-light component in the received light is poor, there is a case that the maximum value or the average value exceeds the saturation threshold value. In such a case, the measurement accuracy of the distance may lower. So, it is desired that the electric charges accumulated in a light receiving period, which is determined in such a degree that saturation does not occur in the photodetector 1, is taken out as the received-light output from the photodetector 1, and the distance is determined by use of the received-light outputs obtained from plural light receiving periods. In this regard, the magnitude of the reflected-light component can be evaluated according to the amplitude of the light received by the photodetector 1. The amplitude is compared with a threshold value set to evaluate the measurement reliability, which is not the saturation threshold value. The amplitude can be determined by the following operation with the use of the received-light amounts (A0, A1, A2, A3) obtained in a time period where it can be regarded that there is no change in the environmental-light component.

$$\{(A0-A2)^2+(A1-A3)^2\}^{0.5}/2$$

In the above embodiments, the same configuration as the frame transfer type CCD image sensor was used. Alternatively, a same configuration as an interline transfer (IT) type or a frame interline transfer (FIT) type CCD image sensor may be used. In addition, when using the interline transfer type to transfer electric charges, the sensitivity control portion 12 may have means for discarding the electric charges. Alternatively, it is also preferred to control a gate portion for delivering the electric charges from the photosensitive portion 11 to the charge take-out portion (vertical transfer portion).

Thus, the spatial information detection system of the present invention is based on the technical concept that the timing of projecting the light from each of plural detection devices is controlled by the timing control portion. Therefore, the effectiveness of the present invention is remarkably exhibited when there are different target spaces each having the spatial information to be detected, and a light projection area in one of the target spaces is partially overlapped with the light projection area in the other target space, or when detecting the spatial information from a plurality of objects, which exist at different distances in a common target space. In other words, when the spatial information is detected from different target spaces not overlapped with each other or when light projection paths are not overlapped with each other, it is not essential to control the light projection timings by the timing control portion because there is no mixture or interference between the lights projected at uncontrolled timings. Nevertheless, it goes without saying that the spatial information detection system of the present invention is available in these cases.

INDUSTRIAL APPLICABILITY

Thus, the present invention has an interest in new problems caused when a plurality of detection devices share a common target space, and is characterized by the formation of the timing control portion as means for solving the problems, which is preferably represented by the first to fourth embodiments described above. Therefore, it is expected to be utilized as a spatial information detection system capable of accurately detecting the spatial information by each of the detection devices without causing interference between the detection devices.

The invention claimed is:

1. A spatial information detection system comprising:
a plurality of detection devices, each of which comprises a light emitting source configured to project light intensity-modulated with a predetermined modulation period into a target space, a photodetector having a photosensitive portion configured to receive light from said target space to generate electric charges corresponding to a received light amount, and an evaluation portion configured to detect spatial information of said target space from a change between the light projected from said light emitting source and the light received by said photodetector; and
a timing control portion configured to control timings of projecting the lights from said light emitting sources of said detection devices such that a light projection period of said light emitting source of one of said detection devices does not overlap with the light projection period of said light emitting source of another one of said detection devices, and to control said photodetector of each of said detection devices to have a light receiving period where said photosensitive portion receives the light from said target space in said light projection period to generate the electric charges, and a read-out period for taking out the electric charges generated at said photosensitive portion, which is set in at least one of said light projection period and a rest period where the light of said light emitting source is not projected into said target space,
wherein said timing control portion is formed in each of said detection devices, and said timing control portion in one of said detection devices outputs a synchro signal to said timing control portion in another one of said detection devices at the end of said light projection period of said light emitting source in the one of said detection devices, so that said timing control portion which has received said synchro signal allows said light emitting source in the another one of said detection devices to initiate said light projection period.

2. The spatial information detection system as set forth in claim 1, wherein said timing control portion which has received said synchro signal allows said light emitting source to await the initiation of said light projection period until said read-out period is finished in the another one of said detection devices.

3. The spatial information detection system as set forth in claim 1, wherein said timing control portion has a mode switching portion configured to selectively set one of a master function where said light emitting source of said detection device having said timing control portion autonomously projects the light and a slave function where said light emitting source of said detection device passively projects the light according to said synchro signal received from said timing control portion of the other detection device.

4. A spatial information detection system comprising:
a plurality of detection devices, each of which comprises a light emitting source configured to project light intensity-modulated with a predetermined modulation period into a target space, a photodetector having a photosensitive portion configured to receive light from said target space to generate electric charges corresponding to a received light amount, and an evaluation portion configured to detect spatial information of said target space from a change between the light projected from said light emitting source and the light received by said photodetector; and
a timing control portion configured to control timings of projecting the lights from said light emitting sources of said detection devices such that a light projection period of said light emitting source of one of said detection devices does not overlap with the light projection period of said light emitting source of another one of said detection devices, and to control said photodetector of each of said detection devices to have a light receiving period where said photosensitive portion receives the light from said target space in said light projection period to generate the electric charges, and a read-out period for taking out the electric charges generated at said photosensitive portion, which is set in at least one of said light projection period and a rest period where the light of said light emitting source is not projected into said target space,
further comprising a central control portion configured to output synchro signals to said timing control portions formed in said detection devices at different timings, and wherein said timing control portion which has received said synchro signal allows said light emitting source of said detection device having said timing control portion to initiate said light projection period.

5. A spatial information detection system comprising:
a plurality of detection devices, each of which comprises a light emitting source configured to project light intensity-modulated with a predetermined modulation period into a target space, a photodetector having a photosensitive portion configured to receive light from said target space to generate electric charges corresponding to a received light amount, and an evaluation portion configured to detect spatial information of said target space from a change between the light projected from said light emitting source and the light received by said photodetector; and
a timing control portion configured to control timings of projecting the lights from said light emitting sources of said detection devices such that a light projection period of said light emitting source of one of said detection devices does not overlap with the light projection period of said light emitting source of another one of said detection devices, and to control said photodetector of each of said detection devices to have a light receiving period where said photosensitive portion receives the light from said target space in said light projection period to generate the electric charges, and a read-out period for taking out the electric charges generated at said photosensitive portion, which is set in at least one of said light projection period and a rest period where the light of said light emitting source is not projected into said target space,
wherein said timing control portion controls a length of said light projection period in each of said detection devices according to the received-light amount of said photosensitive portion.

6. The spatial information detection system as set forth in claim 5, wherein said light projection period is set to be longer as the received-light amount of said photosensitive portion decreases.

7. The spatial information detection system as set forth in claim 5, wherein said detection devices comprise a short range detection device where a short light projection period is set, a long range detection device where a long light projection period is set, and a middle range detection device where said light projection period is set to be longer than the short light projection period, and shorter than the long light projection period.

8. A spatial information detection system comprising:
a plurality of detection devices, each of which comprises a light emitting source configured to project light intensity-modulated with a predetermined modulation period into a target space, a photodetector having a photosensitive portion configured to receive light from said target space to generate electric charges corresponding to a received light amount, and an evaluation portion configured to detect spatial information of said target space from a change between the light projected from said light emitting source and the light received by said photodetector; and
a timing control portion configured to control timings of projecting the lights from said light emitting sources of said detection devices such that a light projection period of said light emitting source of one of said detection devices does not overlap with the light projection period of said light emitting source of another one of said detection devices, and to control said photodetector of each of said detection devices to have a light receiving period where said photosensitive portion receives the light from said target space in said light projection period to generate the electric charges, and a read-out period for taking out the electric charges generated at said photosensitive portion, which is set in at least one of said light projection period and a rest period where the light of said light emitting source is not projected into said target space,
further comprising a setting portion configured to set plural light projection periods having different lengths in each of said detection devices, and a decision portion configured to make a decision as to whether the received-light amount obtained in each of said plural light projection periods is not larger than a predetermined threshold value, and wherein said evaluation portion detects the spatial information of said target space by use of a maximum received light amount, which is not larger than the predetermined threshold value.

9. The spatial information detection system comprising:

a plurality of detection devices, each of which comprises a light emitting source configured to project light intensity-modulated with a predetermined modulation period into a target space, a photodetector having a photosensitive portion configured to receive light from said target space to generate electric charges corresponding to a received light amount, and an evaluation portion configured to detect spatial information of said target space from a change between the light projected from said light emitting source and the light received by said photodetector; and a timing control portion configured to control timings of projecting the lights from said light emitting sources of said detection devices such that a light projection period of said light emitting source of one of said detection devices does not overlap with the light projection period of said light emitting source of another one of said detection devices, and to control said photodetector of each of said detection devices to have a light receiving period where said photosensitive portion receives the light from said target space in said light projection period to generate the electric charges, and a read-out period for taking out the electric charges generated at said photosensitive portion, which is set in at least one of said light projection period and a rest period where the light of said light emitting source is not projected into said target space, further comprising a setting portion configured to set a unit period including a predetermined number of light projection periods with respect to each of said detection devices, and a time adjusting portion configured to reduce the number of light projection periods in said unit period set with respect to one of said detection devices according to environments of said target space, and extend said light projection period(s) of another one of said detection devices by adding time equivalent to the reduced number of light projection period(s).

10. The spatial information detection system as set forth in claim 9, wherein said time adjusting portion is configured to reduce the number of light projection periods with respect to one of said detection devices where the received-light amount reaches a prescribed value at a smaller number of light projection periods than the predetermined number of light projection periods set in said unit period, and extend said light projection period(s) of another one of said detection devices where the received-light amount does not reach the prescribed value by adding time equivalent to the reduced number of light projection period(s).

* * * * *

UNITED STATES PATENT AND TRADEMARK OFFICE
CERTIFICATE OF CORRECTION

PATENT NO. : 7,718,938 B2  Page 1 of 1
APPLICATION NO. : 11/918745
DATED : May 18, 2010
INVENTOR(S) : Fumikazu Kurihara et al.

It is certified that error appears in the above-identified patent and that said Letters Patent is hereby corrected as shown below:

On the title page, item [75]:

Inventors: Fumikazu Kurihara, ~~Kadoma~~ Ikoma-shi (JP); Yuji Takada, ~~Kadoma~~ Kyoto-shi (JP); Yusuke Hashimoto, ~~Kadoma~~ Neyagawa-shi (JP); Fumi Tsunesada, ~~Kadoma~~ Ibaraki-shi (JP)

Signed and Sealed this

Fifth Day of October, 2010

David J. Kappos
*Director of the United States Patent and Trademark Office*